Nov. 19, 1946.         M. YUHAS         2,411,405
STARTER ARRANGEMENT FOR SPLIT PHASE MOTORS
Filed Dec. 3, 1943          2 Sheets-Sheet 1

Inventor:
Marie Yuhas
By: Zabel, Carlson, Fritzbaugh & Wells
Attorneys

Nov. 19, 1946.  M. YUHAS  2,411,405
STARTER ARRANGEMENT FOR SPLIT PHASE MOTORS
Filed Dec. 3, 1943  2 Sheets-Sheet 2
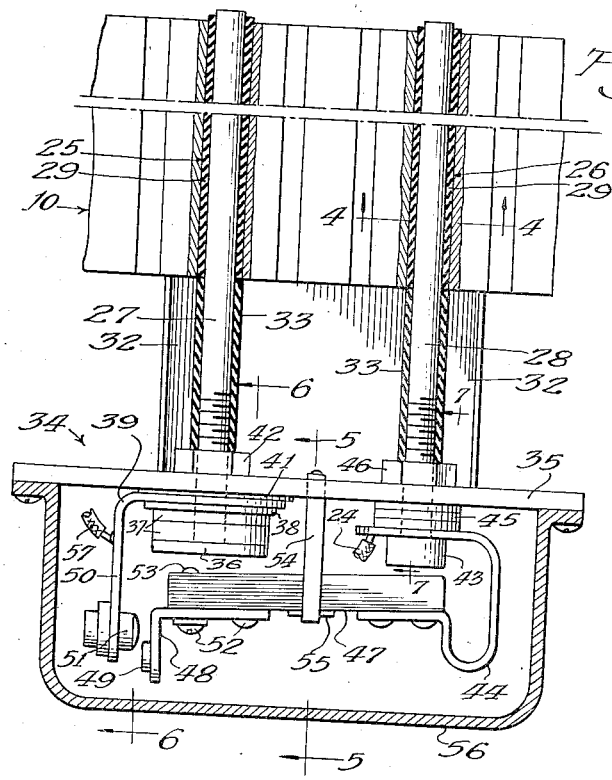
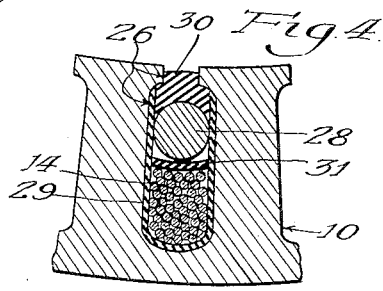
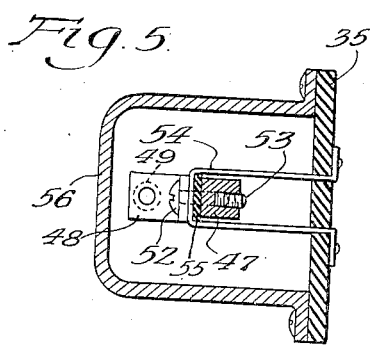
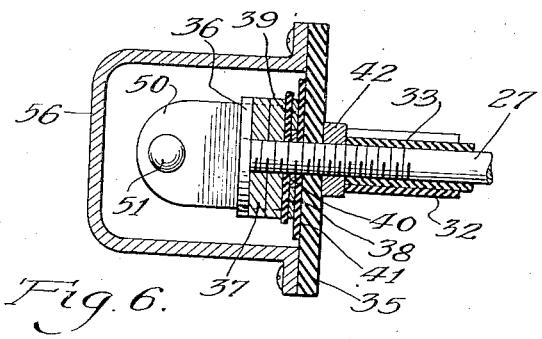
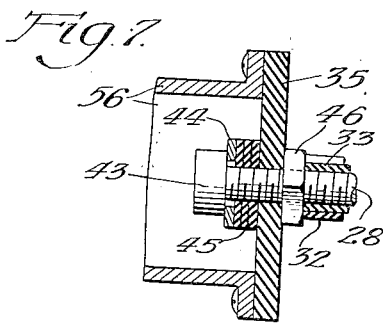
Inventor:
Marie Yuhas
By Zabel, Carlson, Gritzbaugh & Wells
Attorneys Patented Nov. 19, 1946

2,411,405

UNITED STATES PATENT OFFICE 2,411,405

STARTER ARRANGEMENT FOR SPLIT-PHASE MOTORS

Marie Yuhas, Chicago, Ill.

Application December 3, 1943, Serial No. 512,696

1 Claim. (Cl. 172—279)

1

The present invention relates to electric motors and more particularly to means for closing the circuit through the auxiliary starting winding of a split phase motor and subsequently opening the circuit for the starting winding when the motor is brought up to running speed. In split phase motors of the character to which this application refers there is a main or operating winding which serves to energize the field while the motor is running. This winding alone however will not start the motor and the stator of the motor has an additional auxiliary winding thereon which is put into circuit to initially aid in starting the motor and subsequently cut out of circuit once the motor is brought up to speed. The present invention is directed entirely to an attachment for automatically effecting a closure of the circuit through the auxiliary winding when the main switch for energizing the motor is closed, and automatically opening the circuit of the auxiliary winding as soon as the motor has built up its speed.

The present invention contemplates a device which utilizes the magnetic flux which is built up in the stator or core of the motor when the main winding of the motor is connected to a source of current to operate a switch that closes the circuit for the starting winding. The drop in the magnetic flux due to the reduced current drawn by the motor after it is brought up to speed is utilized to open the circuit of the starting winding. The entire unit necessary to accomplish this result is housed in a suitable enclosure that protects it from dust and corrosion and this particular enclosure may be mounted inside the ordinary motor housing. Energy is communicated to the switch by means of a pair of soft iron bars which are inserted in two winding slots of the motor stator. Advantage is taken of the fact that in a standard split phase motor there are certain of the slots which contain only the main windings, thus leaving space enough in the slots for the insertion of the soft iron bars, one bar being inserted alongside a winding on one pole of the motor and another bar being inserted alongside the winding on an adjacent pole of the motor.

The objects and advantages of the invention will appear more fully from the following description, reference being had to the accompanying drawings wherein a preferred form of the invention is shown. It is to be understood however that the drawings and description are illustrative only and are not to be taken as limiting the invention except insofar as it is limited by the claims.

In the drawings:

Figure 3 is an enlarged view illustrating the same structure as is shown in Figure 2 but with the winding slots shown in section and the actual motor windings left off;

Figure 4 is an enlarged fragmentary sectional view taken on the line 4—4 of Figure 3;

Figure 5 is a sectional view taken on the line 5—5 of Figure 3;

Figure 6 is a sectional view taken on the line 6—6 of Figure 3; and

Figure 7 is a sectional view taken on the line 7—7 of Figure 3.

Figure 1:
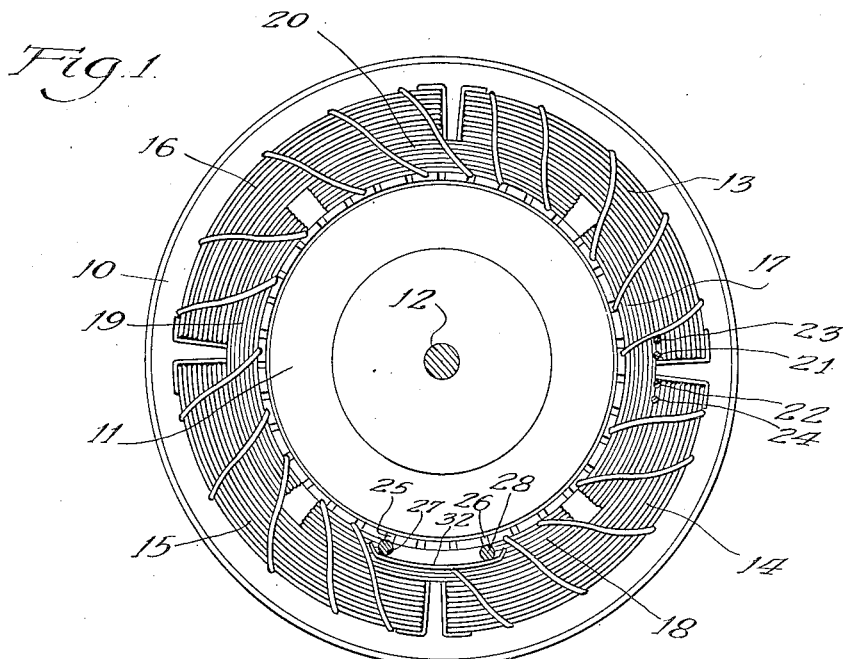
Figure 1 is an end view of a motor with the end cover removed, the view being taken substantially on the line 1—1 of Figure 2.
Figure 2:
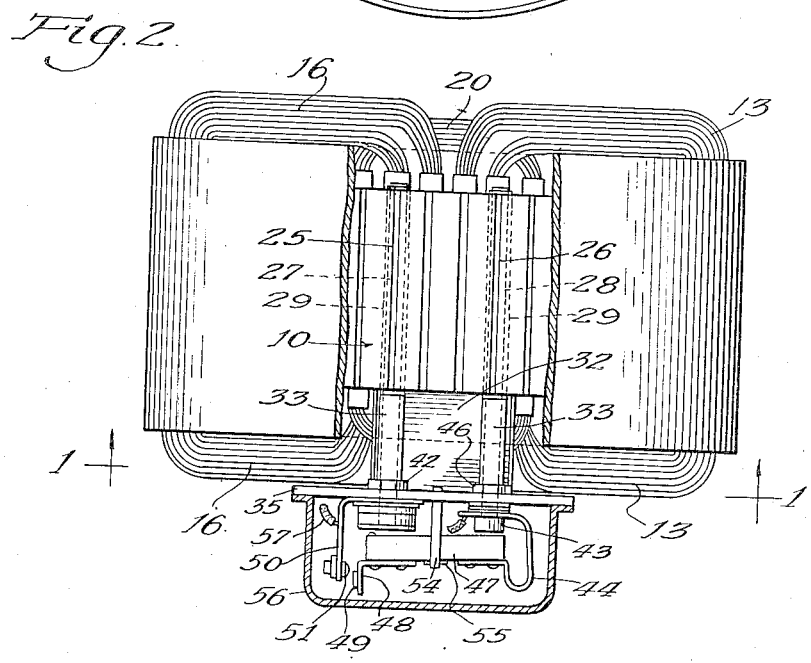
Figure 2 is a plan view of the motor stator with a section thereof broken away so as to show the interior of the stator with my improved device applied thereto.

Referring now in detail to the drawings, and particularly to Figures 1 and 2, my invention is shown as applied to a four pole split phase motor wherein the numeral 10 refers to the stator or core of the motor and the numeral 11 refers to the rotor which is supported by a shaft 12. The main windings of the motor are indicated by the reference numerals 13, 14, 15 and 16. The auxiliary windings are identified by the numerals 17, 18, 19 and 20. The leads to the main windings are shown at 21 and 22 while the auxiliary winding leads are shown at 23 and 24.

According to my invention I utilize two winding slots 25 and 26 of the core as a means for mounting two soft iron bars 27 and 28 directly in the core of the motor alongside the turns of the two adjacent main windings 14 and 15. In the particular motor shown there are four winding slots like the slots 25 and 26 within each auxiliary winding where no turns of the auxiliary winding are placed in the slots. The manner of mounting one of the bars 27 or 28 is illustrated best in Figures 3 and 4. In Figure 4, for example, the main winding 14 is shown in the slot 26. A strip of insulation 29 is placed in the slot around the winding 14 and this strip extends to the reduced outlet of the slot. At the reduced outlet of the slot I provide an elongated strip 30 of insulating material so shaped in cross section as to extend partly into the reduced outlet. The bar 28 lies between the strip 30 and the winding 14 and is separated from the winding 14 by a small strip 31 of insulation. The bars 27 and 28 are separated from the windings outside the slots by a sheet of insulation 32 (see Figure 3). Also, each bar is provided with a sleeve 33 of fibrous insulation material, this sleeve merely covering the part of the bar that projects beyond the motor core toward my improved switching device 34. Now when current is supplied to the main winding of the motor it will be evident that the bars 27 and 28 will be magnetized because of their position in the core of the motor. The reversal of current through the core affects these bars like it does the core but means are provided whereby this reversal is prevented from adversely affecting the operation of the switching device. The bar 27 is passed through the base plate 35 of the switching device 34 and is provided with a head 36 (see Figure 6). A copper slug 37 is placed around the bar 27 adjacent the head 36. A washer 38 of insulation fits against the slug 37 and a contact and terminal spring 39 is mounted beneath the washer 38. This contact and terminal spring is insulated from the bar 27 by a small washer 40 and an additional washer 41 is interposed between the base 35 and the contact and terminal spring. The entire assembly just described is clamped to the base 35 by a nut 42 that is threaded on the bar 27.

The bar 28 is mounted as shown in Figure 7. It has a head 43 thereon and beneath the head 43 there is mounted a spring 44 which rests on an insulating washer 45 that in turn bears against the base 35. A nut 46 is used to clamp the spring 44 and the washer 45 beneath the head 43. The spring 44 carries an armature bar 47 which is substantially U-shape in cross section as shown in Figure 5. Since the bar 28 is completely insulated from the motor core it need not be insulated from the spring 44 which serves as a terminal for attachment of the lead 24 from the auxiliary windings. The spring 44 so mounts the armature bar 47 as to hold the mounted end thereof in close proximity to but spaced from the head 43 as illustrated in Figure 3. At its free end the armature bar 47 carries a contact mounting strip 48 that has a contact element 49 thereon. The terminal spring 39 is turned up to provide a portion 50 that carries a contact 51 positioned to be engaged by the contact 49 when the armature 47 is attracted. Two screws 52 of non-metallic material serve to mount the strip 48 and in addition one of them extends through the bar 47 far enough to provide a stop 53 (see Figures 3 and 5) which prevents direct contact of the armature bar with the head 36 of the soft iron bar 27.

A guide yoke 54 is looped over the middle of the armature bar 47 and is provided with a cushioning pad 55 to cushion the impact of the armature bar when it springs back to the open circuit position shown in Figure 3. The entire switch assembly is enclosed by a cover 56 which is mounted on the base 35. The lead 24 and a lead 57 to the source of current pass through suitable openings provided in the cover 56 so that the entire switch assembly may be closed tight to prevent dust from getting into the enclosure and fouling the contacts 49 and 51.

The wiring diagram for the motor has not been shown but it is believed to be clear that the main windings 21 and 22 are connected through a main switch to a source of current. The lead 24 is connected, as already described, to the spring 44 while the lead 23 of the auxiliary winding goes to the source of current. Likewise the lead 57 may go to the source of current through the main switch.

In operation, when the main switch is closed current is supplied directly to the main windings 13, 14, 15 and 16. This main current, when the motor is stationary, is quite heavy and creates a strong magnetic flux in the bars 27 and 28. This attracts the armature 47 against the tension of the spring 44 so as to close the contacts 49 and 51 whereupon current is supplied to the auxiliary windings 17, 18, 19 and 20 because closing the contacts 49 and 51 establishes a circuit from the lead 57 through the portion 50 of the spring 39, then through the armature bar 47 and the spring 44 to the lead 24. The auxiliary winding is thus energized to effect starting of the motor in the well known manner. However, as soon as the motor gains running speed the current in the main winding drops to a fraction of what it was when the rotor of the motor was standing still. As a result of the reduced current flowing in the main winding the attraction of the armature 47 by the bars 27 and 28 is materially reduced. In fact, the reduction is adequate to permit the spring 44 to retract the armature and thus open the contacts 49 and 51. This takes the auxiliary windings out of circuit and as long as the motor continues to run the main winding only will be energized.

The function of the copper slug 37 is to retard the magnetization and reversal of magnetization in the bar 27 so that it will not cause the armature to chatter due to the normal reversal of current in an alternating current source of supply. I found that without this slug the repeated closing and opening of the contacts 49 and 51 due to chattering of the armature 47 defeated the purpose of the device. I found it necessary to provide the stop screw 52 to prevent freezing of the armature 47 to the head 36 on the bar 27. If the armature is allowed to contact the heads 36 and 43 then the lowering of current due to the build up in speed of the motor may not release the armature and the auxiliary windings may remain in circuit.

The guide yoke 54 serves to limit the backward movement of the armature so that it is immaterial whether the weight of the armature is directed away from the heads 36 and 43 or toward them. It appears that attractive force obtained in the starting of the motor is sufficient to readily overcome the weight of the armature in case gravity tends to pull the armature away from the heads 36 and 43. The armature is made U-shaped in cross section partially to reduce its weight and partially because it appears to aid in magnetic attraction of the armature by the heads 36 and 43.

The bars 27 and 28 may be fixed in the slots of the stator in any suitable fashion. However, I find that it is not necessary to fasten them because the actual attraction tends to pull them into the stator slots and the insulating tubes 33 limit the inward movement of the bars.

It is believed to be evident from the foregoing description and the drawings that I have provided a very simple and effective means for energizing and de-energizing the starting windings of a split phase motor. The device involves very few moving parts and can be made completely dust and gas proof by sealing it in the enclosure. Likewise the device is so small and compact that it can be housed directly within the motor housing, if desired.

Having thus described my invention, what I claim as new and desire to secure by Letters Patent is:

A switch for closing circuit through a starting winding of a split phase motor and opening said circuit when the motor has started, said switch comprising magnetizable means in the core of the motor and projecting therefrom, an armature, spring means mounting said armature in proximity to the projecting part of said magnetizable means and operable to oppose attraction of said armature by the magnetizable means with a force capable of overcoming the attractive force of said means when energized by running current in the motor but incapable of holding the armature away from said means when said means is energized by starting current in the motor, a stationary contact and a contact operably connected with said armature to engage the stationary contact only when the armature is attracted by said magnetizable means, said magnetizable means comprising a pair of bars of soft iron, each seated in a winding slot of the core that contains the main windings, the bars being in different poles of the motor core, and said armature being positioned to complete the magnetic circuit through said bars.

MARIE YUHAS.